US012202013B2

(12) United States Patent
Wright

(10) Patent No.: US 12,202,013 B2

(45) **Date of Patent: *Jan. 21, 2025**

(54) ARTICULATING DUST COLLECTOR

(71) Applicant: Korri L. Wright, Yuma, AZ (US)

(72) Inventor: Korri L. Wright, Yuma, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,174

(22) Filed: Apr. 3, 2023

(65) Prior Publication Data

US 2023/0234102 A1 Jul. 27, 2023

Related U.S. Application Data

(63) Continuation of application No. 17/134,457, filed on Dec. 27, 2020, now Pat. No. 11,623,251, which is a continuation of application No. 16/355,735, filed on Mar. 16, 2019, now Pat. No. 10,875,058, which is a continuation-in-part of application No. 15/640,337, filed on Jun. 30, 2017, now Pat. No. 10,251,527.

(Continued)

(51) Int. Cl.

| | |
|---|---|
| ***A47L 13/38*** | (2006.01) |
| ***A47L 13/42*** | (2006.01) |
| ***A47L 25/00*** | (2006.01) |
| ***B08B 1/00*** | (2006.01) |
| ***B08B 1/10*** | (2024.01) |
| ***B08B 6/00*** | (2006.01) |
| ***F04D 25/08*** | (2006.01) |
| ***F04D 29/38*** | (2006.01) |
| ***F04D 29/70*** | (2006.01) |

(52) U.S. Cl.

CPC ................ *B08B 1/10* (2024.01); *A47L 13/38* (2013.01); *A47L 13/42* (2013.01); *A47L 25/00* (2013.01); *B08B 1/00* (2013.01); *B08B 6/00* (2013.01); *F04D 25/088* (2013.01); *F04D 29/384* (2013.01); *F04D 29/703* (2013.01)

(58) Field of Classification Search

CPC . A47L 13/42; A47L 13/38; B08B 1/00; B08B 1/10; F04D 25/088

See application file for complete search history.

(56) References Cited

U.S. PATENT DOCUMENTS 4,827,556 A * 5/1989 Corsetti .................. A47L 13/24 15/210.1

5,116,151 A * 5/1992 Lytton ........................ A47L 4/00 15/210.1

(Continued)

*Primary Examiner* — Michael D Jennings

(74) *Attorney, Agent, or Firm* — CHARMASSON, BUCHACA & LEACH, LLP

(57) ABSTRACT

The device includes a substantially cylindrical, oblong, rigid, extension pole having a distal end upon which is formed an articulatable jaw structure head which can be actuated between open and closed positions by the pull of either a medial handle or knob located at the proximal end. A collector sock made from a pliable sheet material can be mounted upon the jaw structure so that the sock enwraps the entire item to be dusted such as a ceiling fan blade. The inner surface of the sock surrounding its open end maw can include asperities and electrostatic, dust adhering fibers to help scrape off and capture fine particles of dust and other debris from the item being dusted. The head can include a pair of parallely separatable cantelevered beams engaging the sock.

18 Claims, 8 Drawing Sheets

Related U.S. Application Data

(60) Provisional application No. 62/357,878, filed on Jul. 1, 2016.

(56) References Cited

U.S. PATENT DOCUMENTS

| | | | | | |
|---|---|---|---|---|---|
| 5,313,687 | A * | 5/1994 | Schneider | A47L 9/06 | 15/394 |
| 5,319,821 | A * | 6/1994 | Nicholson | A46B 15/0053 | 15/144.3 |
| 5,369,836 | A * | 12/1994 | Horne | A47L 4/00 | 15/210.1 |
| 5,410,776 | A * | 5/1995 | Schneider | A47L 7/00 | 285/272 |
| 5,488,754 | A * | 2/1996 | Shadley | A47L 4/00 | 15/394 |
| 5,765,259 | A * | 6/1998 | Cika | A47L 4/00 | 15/396 |
| 6,022,192 | A * | 2/2000 | DeLaHoz | F04D 29/70 | 416/62 |
| 6,345,409 | B1 * | 2/2002 | LaCroix | A47L 9/0693 | 134/21 |
| 6,782,579 | B1 * | 8/2004 | Grimm | F04D 25/088 | 416/62 |
| 7,363,674 | B2 * | 4/2008 | Marshall | A47L 4/00 | 15/210.1 |
| 7,430,781 | B2 * | 10/2008 | Collins | A47L 4/02 | 15/220.3 |
| 8,734,585 | B1 * | 5/2014 | Muncy | A47L 4/00 | 15/210.1 |
| 8,826,484 | B2 * | 9/2014 | Schultheis | A46B 7/044 | 15/246 |
| 10,251,527 | B2 * | 4/2019 | Wright | A47L 13/42 | |
| 2018/0000309 | A1 * | 1/2018 | Wright | A47L 13/253 | |

* cited by examiner

ARTICULATING DUST COLLECTOR

PRIOR APPLICATION

This application is a continuation of U.S. patent application Ser. No. 17/134,457, filed Dec. 27, 2020, which is a continuation of U.S. patent application Ser. No. 16/355,735, filed Mar. 16, 2019, issued Dec. 29, 2020 as U.S. Pat. No. 10,875,058, which is a continuation-in-part of U.S. patent application Ser. No. 15/640,337, filed Jun. 30, 2017, issued Apr. 9, 2019, as U.S. Pat. No. 10,251,527, which claims the benefit of U.S. Provisional Utility Patent Application Ser. No. 62/357,878, filed Jan. 7, 2016, all of which are incorporated herein by reference.

FIELD OF THE INVENTION

This invention relates to household cleaning items, and more particularly to devices for removing dust from furniture and other household surfaces such as ceiling fans.

BACKGROUND

Ceiling fan blades often accumulate dust and other debris. The blades are difficult to clean because ceiling fans are often located in relatively inaccessible areas. Thus dusting them can take an inordinate amount of time compared to dusting other, more accessible items in the household. This difficulty often leads the house keeper to forego dusting until a later time, which in turn leads to an even greater accumulation of dust. Greater accumulation of dust can lead to the creating of unsightly dust globs which are difficult for dusters to capture. Uncaptured dust globs can fall from the fan soiling the floor, carpeting or other furniture items beneath the fan. Cleaning with some devices such as a feather duster may dislodge dust globs to fall to the floor.

Another important difficulty in dusting ceiling fan blades concerns safety. Fans are often located high above the floor and may only be accessible by ladder. Housekeepers are often tempted to use more rapid but less secure means for reaching the fan blades. Balancing on wobbly stepping stools, or swivellable chair seats while vigorously wiping the blades can lead to falls causing serious bodily injury.

Horne, U.S. Pat. No. 5,369,836 discloses a mechanism for cleaning fan blades including a flexible tubular sleeve which uses moveable flat metal plates at the open end of the sleeve engaged by a spring-loaded, hand-held maneuvering portion in order to fit the sleeve over the blade and withdraw the sleeve from the blade to clean it. One apparent problem with the device shown in Horne is flat plates appear to be curved either vertically or horizontally such that the middle of the plates do not oppose one another across the surface of the blade. It is believed this lack of direct opposition can tend to reduce the effectiveness of any scraping motion across the surface of the blade. Another apparent problem with the Home device is that the maneuvering portion appears to be biased toward the open position requiring the user to adjust their grip to determine the force between the plates while translating the device across the blade. Such complex maneuvering can only be expected by skilled and experienced users. Lastly, the Home device does not allow for adjustment to engage blades most comfortably beyond the reach of the user.

Such prior fan cleaning apparatusses can be heavy which rapidly fatigues the shoulder and arm muscles due to the reaching up motion of the user.

Therefore, there is a need for a ceiling fan duster which addresses one or more of the above problems or inadequacies.

Summary

The principal and secondary objects of the invention are to provide an improved ceiling fan dust collector. These and other objects are achieved by providing a duster device which articulates to enwrap a section of the fan blade and capture the dust.

In some embodiments the device provides biased contact to both sides and edges of the fan blade in one motion. In some embodiments the device includes a detachable sock commensurately shaped and dimensioned to engage over substantially the entire length of the blade. In some embodiments the sock can be made from an inexpensively manufactured, biodegradable, disposable fabric material. In some embodiments, the sock can include electrostatically charged micro fibers oriented to contact the fan blade surfaces during use.

In some embodiments there is provided an apparatus for dusting a ceiling fan blade, said apparatus comprises: an elongated member; a jaw structure connected to a first end of said member, said articulatable jaw structure being moveable between a closed position and an open position; said jaw structure comprising a pair of opposing inner surfaces; at least one trigger mounted to said elongated member; a jaw manipulation mechanism responsive to said at least one trigger for moving said jaw structure between said open position and said closed position; a first beam supporting a first one of said pair of opposing inner surfaces; a second beam supporting a second one of said pair of opposing inner surfaces; wherein said first beam is canteleveredly supported upon a stationary frame; wherein said second beam is canteleveredly supported upon a movable rack; and, wherein said movable rack is axially and reciprocatingly moveable between an upper axial location and a lower axial location corresponding to said jaw structure being in said closed position and said open position respectively.

In some embodiments said stationary frame comprises a substantially U-shaped guard planarly surrounding said first and second beams.

In some embodiments said stationary frame further comprises a door openably closing an open end of said guard.

In some embodiments said movable rack comprises a springing switchback.

In some embodiments said first and second beams are substantially parallely spaced apart and are oriented to between about 6 and 10 degrees from the horizontal.

In some embodiments the apparatus further comprises a brace bearing against a first free end of said first beam, and bearing against a second free end of said second beam.

In some embodiments the apparatus further comprises a pliable sock comprising: an open end; a closed end opposite said open end; and, wherein said closed end is reversably openable.

In some embodiments said sock further comprises inwardly facing sock surfaces comprising a plurality of asperities extending therefrom.

In some embodiments said sock further comprises a patch of dust attracting material located on at least one of said inwardly facing sock surfaces.

In some embodiments said jaw manipulation mechanism is biased toward said closed position.

In some embodiments said jaw manipulation mechanism comprises a compression spring resisting downward motion of said rack.

In some embodiments said elongated member comprises: a top piece; a base piece; said top piece connected to said jaw structure; and, said top piece being telescopingly connected to said base piece.

In some embodiments said beams have an I-shaped cross-section.

In some embodiments there is provided an apparatus for dusting a ceiling fan blade having a pair of substantially parallel lateral edges, said apparatus comprises: an elongated member; a pliable sock comprising an open end; an articulatable jaw structure connected to a first end of said member, said articulatable jaw structure being moveable between a closed position and an open position; said jaw structure comprising a pair of opposing inner surfaces; said opposing inner surfaces being oriented to simultaneously contact a top continuous surface extending across said blade between said edges, and a bottom continuous surface extending across said blade between said edges when said jaw is in a closed position; at least one trigger mounted to said member; a jaw manipulation mechanism responsive to said trigger for moving said jaw between said open and closed position; wherein said open end of said sock is releasably mounted to said jaw structure, whereby said open end forms a maw when said articulatable jaw structure is in said open position; wherein said maw includes inwardly facing sock surfaces forming said opposing inner surfaces of said jaw; and, wherein said maw is shaped an dimensioned to slip over said fan blade in an end-wise manner.

In some embodiments said jaw structure further comprises: a first beam supporting a first one of said pair of opposing inner surfaces; a second beam supporting a second one of said pair of opposing inner surfaces; wherein said first beam is canteleveredly supported upon a stationary frame; wherein said second beam is canteleveredly supported upon a movable rack; and, wherein said movable rack is axially and reciprocatingly moveable between an upper axial location and a lower axial location corresponding to said jaw structure being in said closed position and said open position respectively.

The original text of the original claims is incorporated herein by reference as describing features in some embodiments.

DESCRIPTION OF THE EXEMPLARY EMBODIMENTS

Figure 1:
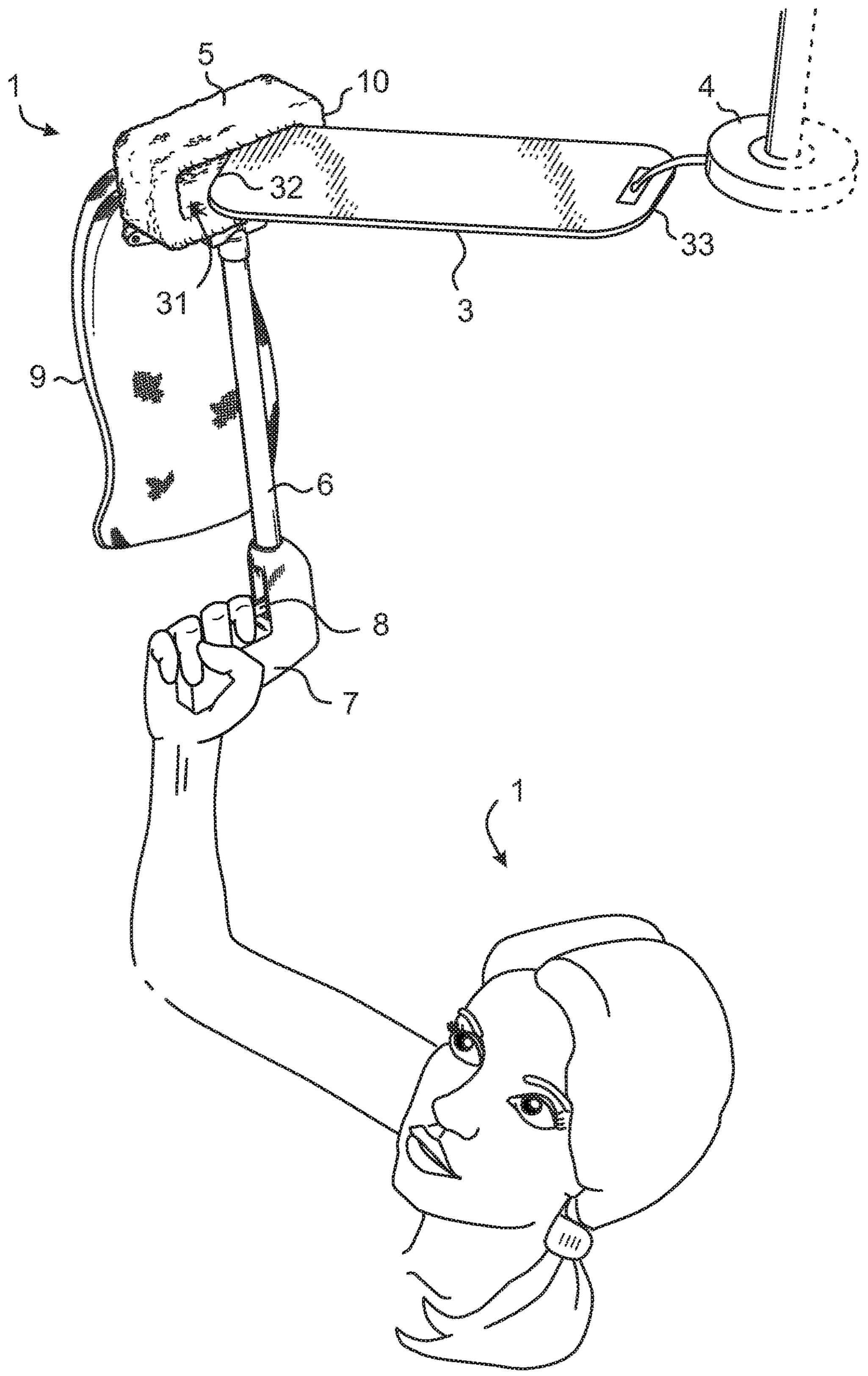
FIG. 1 is a diagrammatic perspective view of an articulating dust collector for ceiling fan blades according to an exemplary embodiment of the invention being operated by a user.

In this specification, the references to top, bottom, upward, downward, upper, lower, vertical, horizontal, sideways, lateral, back, front, etc. can be used to provide a clear frame of reference for the various structures with respect to other structures while the articulating dust collector is being used by a user to clean a fan blade as shown in FIG. 1, and not treated as absolutes when the frame of reference is changed, such as when the collector is laying on the ground unused.

The term "substantially" can be used in this specification because manufacturing imprecision and inaccuracies can lead to non-symmetricity and other inexactitudes in the shape, dimensioning and orientation of various structures. Further, use of "substantially" in connection with certain geometrical shapes, letter shapes, such as "U-shaped" and orientations, such as "parallel" and "perpendicular", can be given as a guide to generally describe the function of various structures, and to allow for slight departures from exact mathematical geometrical shapes, letter shapes, and orientations, while providing adequately similar function. Those skilled in the art will readily appreciate the degree to which a departure can be made from the mathematically exact geometrical references.

Figure 2:
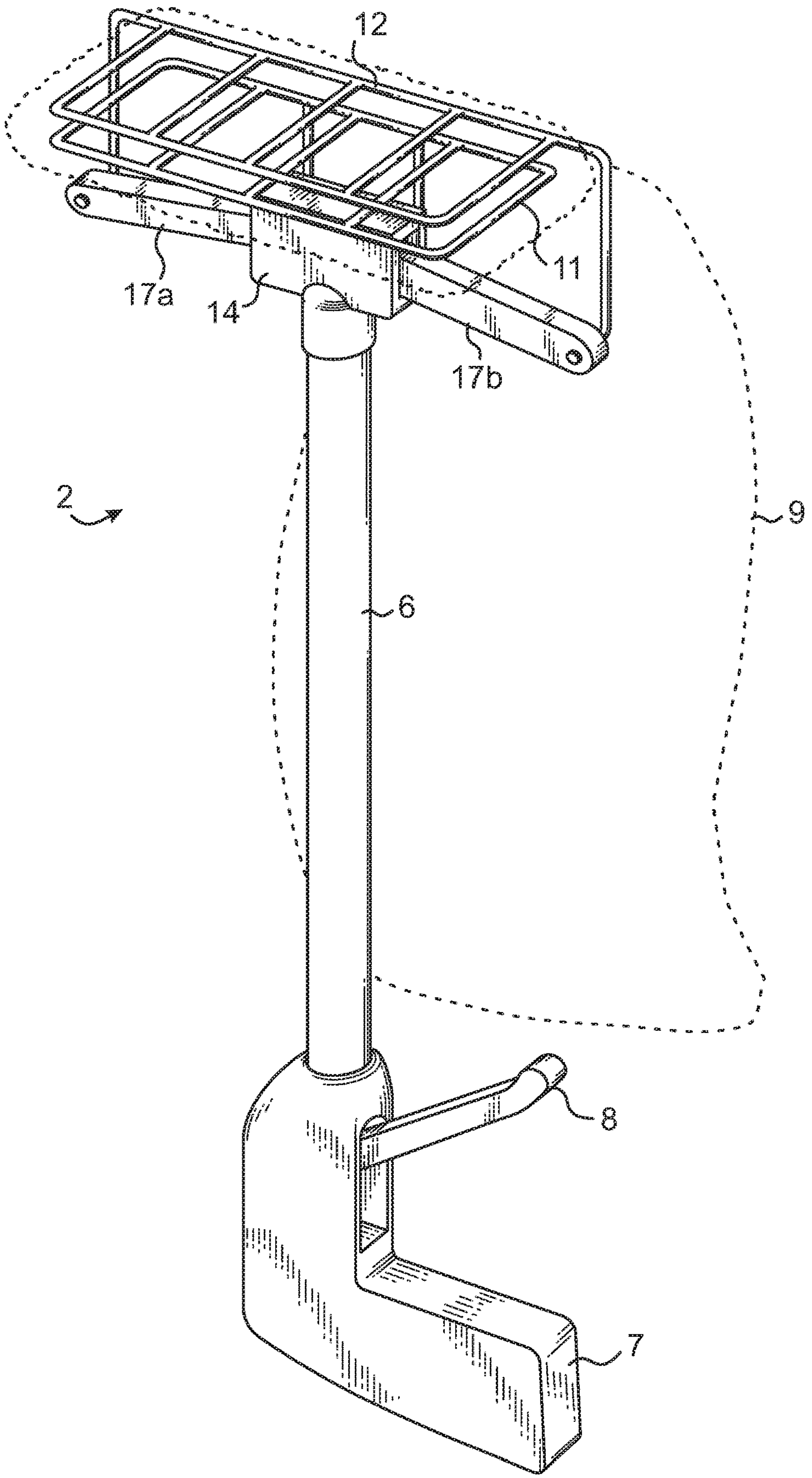
FIG. 2 is a diagrammatic front, top, left perspective view of the articulating dust collector including the collector sock shown in dashed lines.
Figure 3:
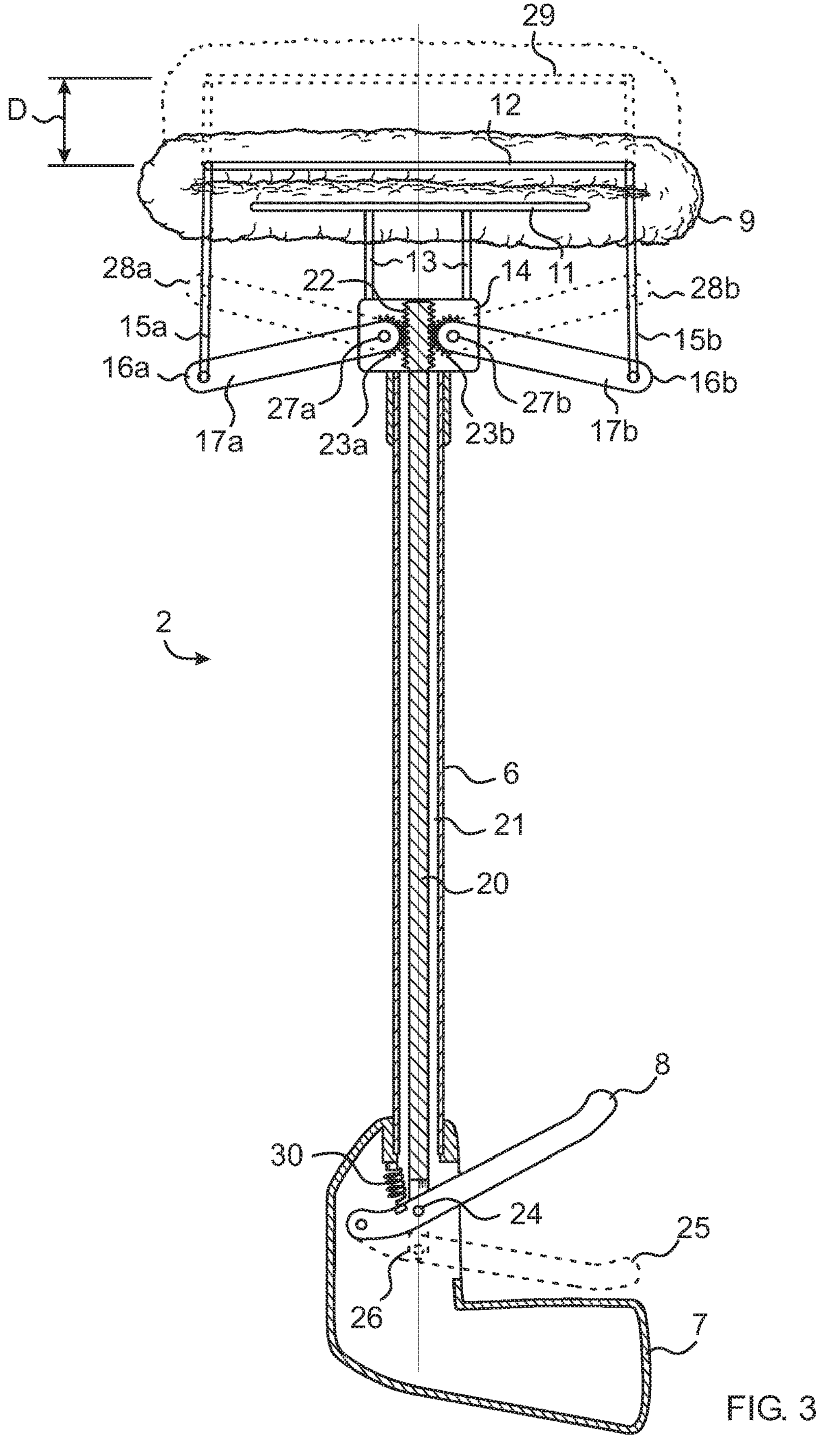
FIG. 3 is a diagrammatic partial cross-sectional front view of the articulating dust collector of FIG. 2.

Referring now to FIGS. 1-3 there is shown a user 1 cleaning a blade 3 of a ceiling fan 4 using an articulating dust collector 2 according to an exemplary embodiment of the invention. Each blade includes a pair of substantially parallel lateral edges extending from a connected end to a free end. Between the edges extends a substantially planar top and bottom surface. The blade is tilted at about a 8 degrees. A section of the blade can extend continuously and substantially planarly between the edges at a given distance from the connected end.

The articulating dust collector can include an openable jaw structure or head 5 located on the distal end of a hollow, oblong, extension pole 6. The proximal end of the extension pole can have a handle 7 which can be grasped by the single hand of the user, and a trigger 8 for activating a jaw opening and closing mechanism within the collector. A collector sock 9 can have its open end 10 secured to the jaw structure.

The head 5 can include a pair of opposing, parallelly spaced apart jaws in the form of paddles 11,12 that separate from each other when the jaw structure is in the open position and come together in the closed position. The bottom paddle 11 can be fixed by a pair of support struts 13 to a housing 14 secured to the distal end of the extension pole 6. A second pair of support struts 15*a*,15*b* can extend between the top paddle 12 and a pair of moveable flippers 17*a*,17*b* hingedly attached to the housing. The support struts of the upper paddle 15*a*,15*b* can be fixed to the opposite lateral edges of the upper paddle and hingedly connect to the laterally distal ends 16_a_,16_b_ of the flippers.

The flippers 17_a_,17_b_ can be driven to swing between a lower position shown in solid lines in the drawing, and an upper position shown in dashed lines in the drawing, by a drive mechanism carried within the collector 2. The drive mechanism includes a rigid post 20 extending from the handle 7 to the housing 14 through the central lumen 21 of the extension pole 6. The proximal end of the post can be hingedly connected 24 to the trigger 8. The distal end of the post can have an array of axially spaced apart teeth 22 engaged by the geared laterally proximal ends 23_a_,23_b_ of the flippers. In this way when the trigger is depressed 25, the post moves downwardly 26, in an axially proximal direction. This causes the toothed distal end of the post to move across the laterally proximal ends of the flippers, causing the flippers to rotate about pivot points 27_a_,27_b_, driving the flipper distal ends toward their upper position 28_a_,28_b_. This causes the top paddle 12 to move upwardly a distance D, in the axially distal direction, to an upper position 29, so that the jaw is in its open position. A spring 30 biases the trigger and thus the jaw toward the closed position.

In this way, referring back to FIG. 1, when the jaw is in the open position, the open end of the attached sock 9 forms an open maw 31. The maw can then be journaled endwise over the cantilevered fan blade 3 until the blade is substantially fully contained within the sock. In other words, the maw can be moved from the free end 32 of the blade to its attached end 33. Once the sock opening has reached the attached end the user can release the trigger, allowing the maw to close, contacting the sock opening against the blade. When the maw is withdrawn from the blade in the opposite journaling motion, the internal surfaces of the sock scrape against the blade and dislodge and capture the dust and other debris that has accumulated on the blade. The process can be repeated to dislodge stubborn debris. Because the jaws are biased toward the closed position, less skill is required to provide an adequate clamping force on the top and bottom surfaces of the blade. In this way, the device can both dust and capture dust globs which do not adhere to the inwardly facing sock surfaces surrounding the maw.

Figure 4:
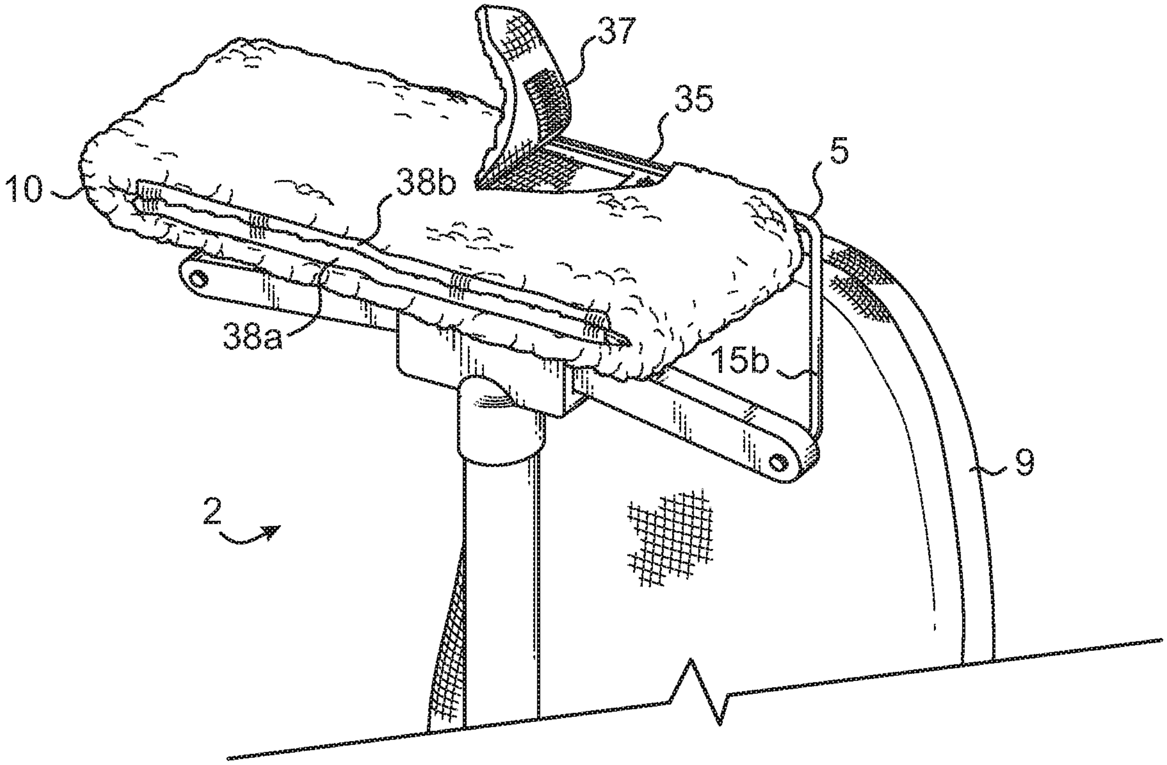
FIG. 4 is a partial, diagrammatic front, top, left perspective view of the jaw structure of an articulating dust collector showing various sock attachment features.

As shown in FIG. 4, the open end 10 of the sock 9 can be releasably secured to the jaw structure 5 of the collector 2 in various ways. A first way involves the sock having a circumferential elastic band 35 or drawstring surrounding the opening which when folded back upon itself cinches around the base of the jaw paddles near the supporting struts (only 15_b_ shown). Alternately, patches 37 of Velcro brand hook-and-loop fabric fastener, or other common fasteners. In this way the sock can be detached from the collector for cleaning, such as in a clothes washing machine, or disposal, and replaced with a clean sock. The sock can be made from a durable, flexible sheet material such as fabric, or other commonly available, and readily manufacturable sheet material. Alternately, the sock can be made from an inexpensive, disposable sheet material such as breathable polypropylene fabric. The inner surfaces of the maw can include panels 38_a_,38_b_ of electrostatic, dust adhering fibers to help capture fine particles of dust.

Figure 5:
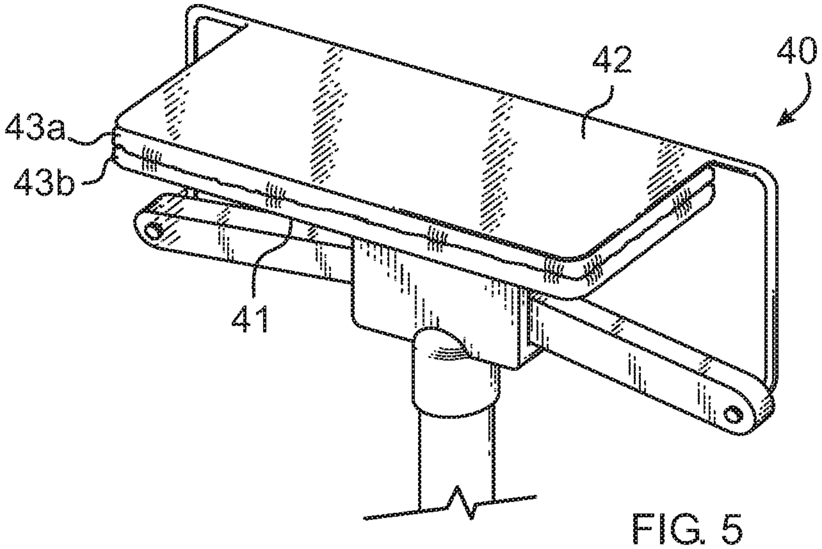
FIG. 5 is a partial, diagrammatic front, top, left perspective view of the jaw structure of a sockless articulating dust collector according to an alternate exemplary embodiment of the invention.

Referring now to FIG. 5, there is shown an alternate embodiment of articulating dust collector 40 wherein the inner surfaces of the upper and lower paddles 41,42 are solid and can carry pair of opposing panels 43_a_,43_b_ of electrostatic, dust adhering fibers. In this embodiment the dust will adhere to the panels and there is no need for the sock. This adaptation of the device can be used for more frequent uses where only a light film of dust has accumulated.

Figure 6:
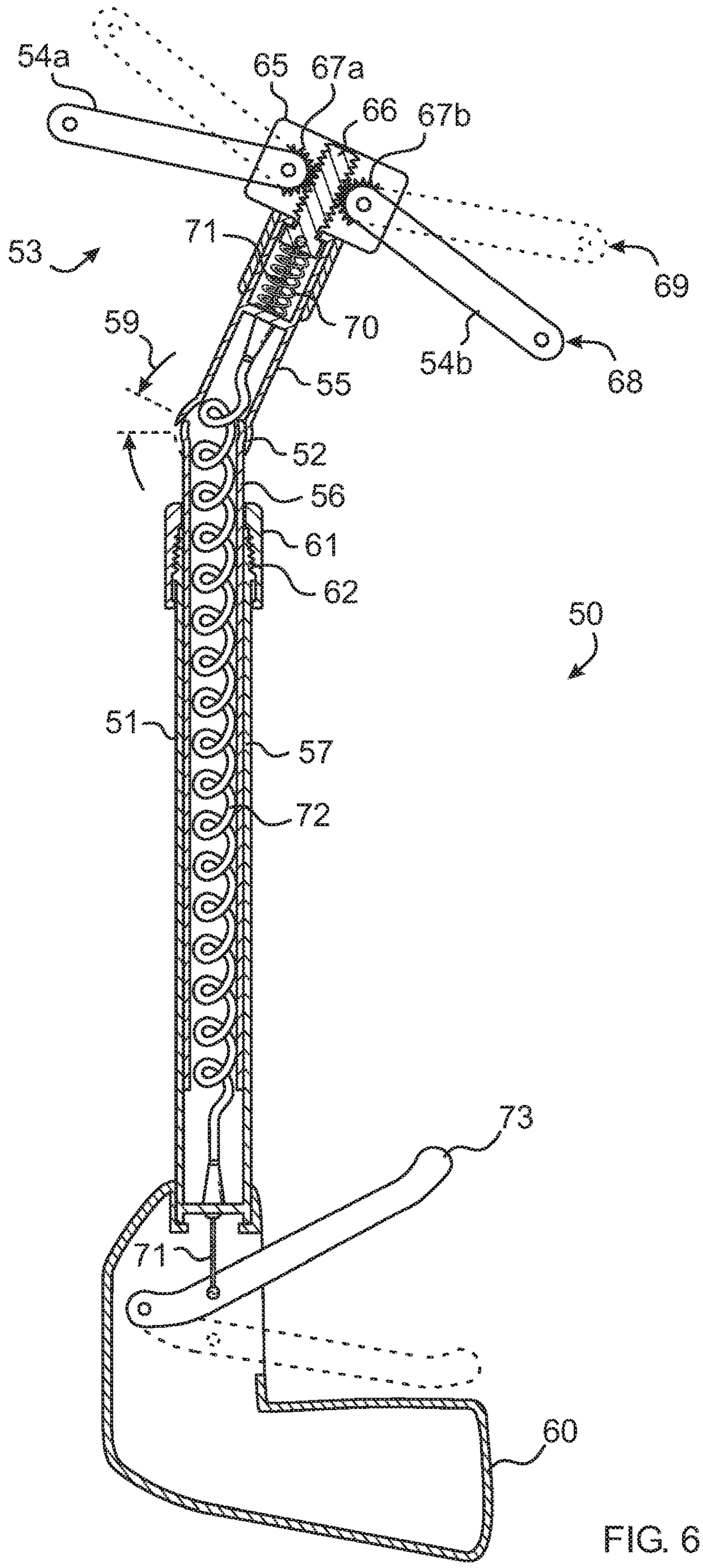
FIG. 6 is a diagrammatic partial cross-sectional front view of the jaw structure of an articulating dust collector according to an alternate exemplary embodiment having a telescoping and angularly adjustable extension pole.

Referring now to FIG. 6 there is shown an alternate embodiment of articulating dust collector 50 which allows for a telescoping extension pole 51 which also provides for an angularly adjustable jaw structure 53. For clarity, the jointed connection 52 between the extension pole pieces shows the jaw structure pivoting in the same plane of movement as the flippers 54_a_,54_b_. Those skilled in the art will readily recognize that other planes of movement may be preferable for enhanced function of the collector.

The extension pole 51 can include three rigid pieces, namely, a top piece 55, a medial piece 56, and a base piece 57. The top piece includes a distal end connected to the jaw structure 53, and a proximal end connected to the joint 52. The medial piece 56 has a distal end connected to the joint, and a proximal end portion the telescopingly engaging the base piece 57. The base has a distal end engaged by the medial piece, and a proximal end connected to the handle 60.

The joint 52 can be a ball-in-socket-type, universal joint, which allows limited angular adjustment 59 of the position of the top piece 55, and thus the jaw structure 53, with respect to the medial piece 56, and thus the handle 60. The joint can have a friction fit so that it retains its angular positioning unless sufficient force is used to alter it, or can use other well known means to secure its orientation.

The axial length of the extension pole 51 can be adjusted by telescopingly moving the axial location of the medial piece 56 with respect to the base piece 57. The relative positioning of the medial and base pieces can be releasably fixed by tightening a screw-based compression collar 61 engaging the split threaded distal end 62 of the base piece, which clamps the inner surface of the base piece onto the outer surface of the medial piece. The telescoping pole allows the user to adjust the distance between the handle and the head for greater comfort.

The movement of the flippers 54_a_,54_b_ between a retracted position 68 and an extended position 69 corresponding to the closed and open positions of the jaw respectively, are controlled similarly to the embodiment of FIG. 3. The flippers are hingedly mounted to a housing 65 secured to the distal end of the top piece 55 of the extension pole 51. An axially movable toothed post 66 engages the geared proximal ends 67_a_,67_b_ of the flippers. The flippers are biased toward the retracted position by a compression spring 70 urging the toothed post upward in the distal direction. The bias of the post can be overcome by a force applied to the post by a cable 71 running within a coiled, flexible conduit 72 connected to the trigger 73 in the handle 60.

Figure 7:
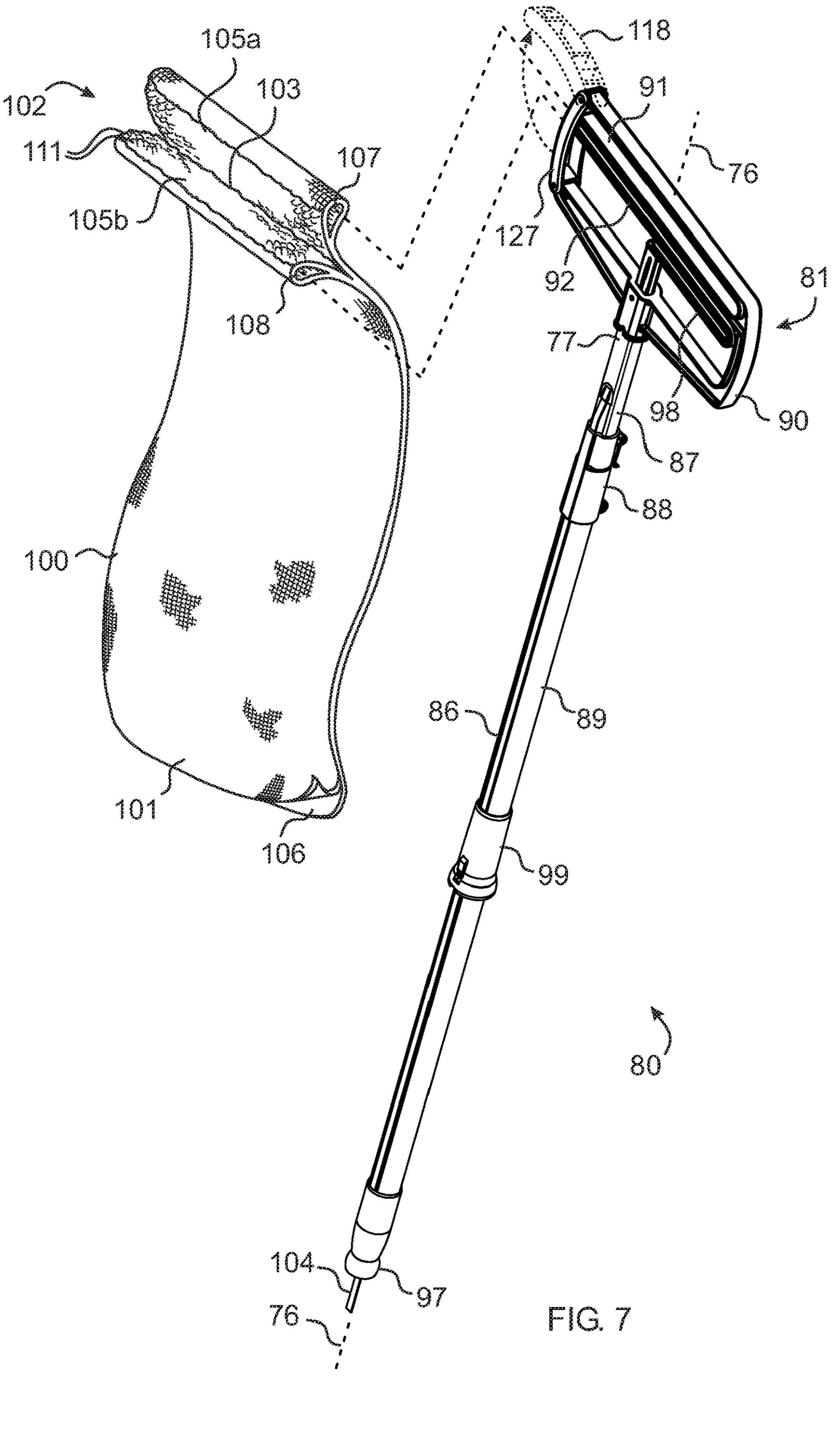
FIG. 7 is a diagrammatic perspective view of an articulating dust collector for ceiling fan blades according to an alternate exemplary embodiment of the invention.
Figure 8:
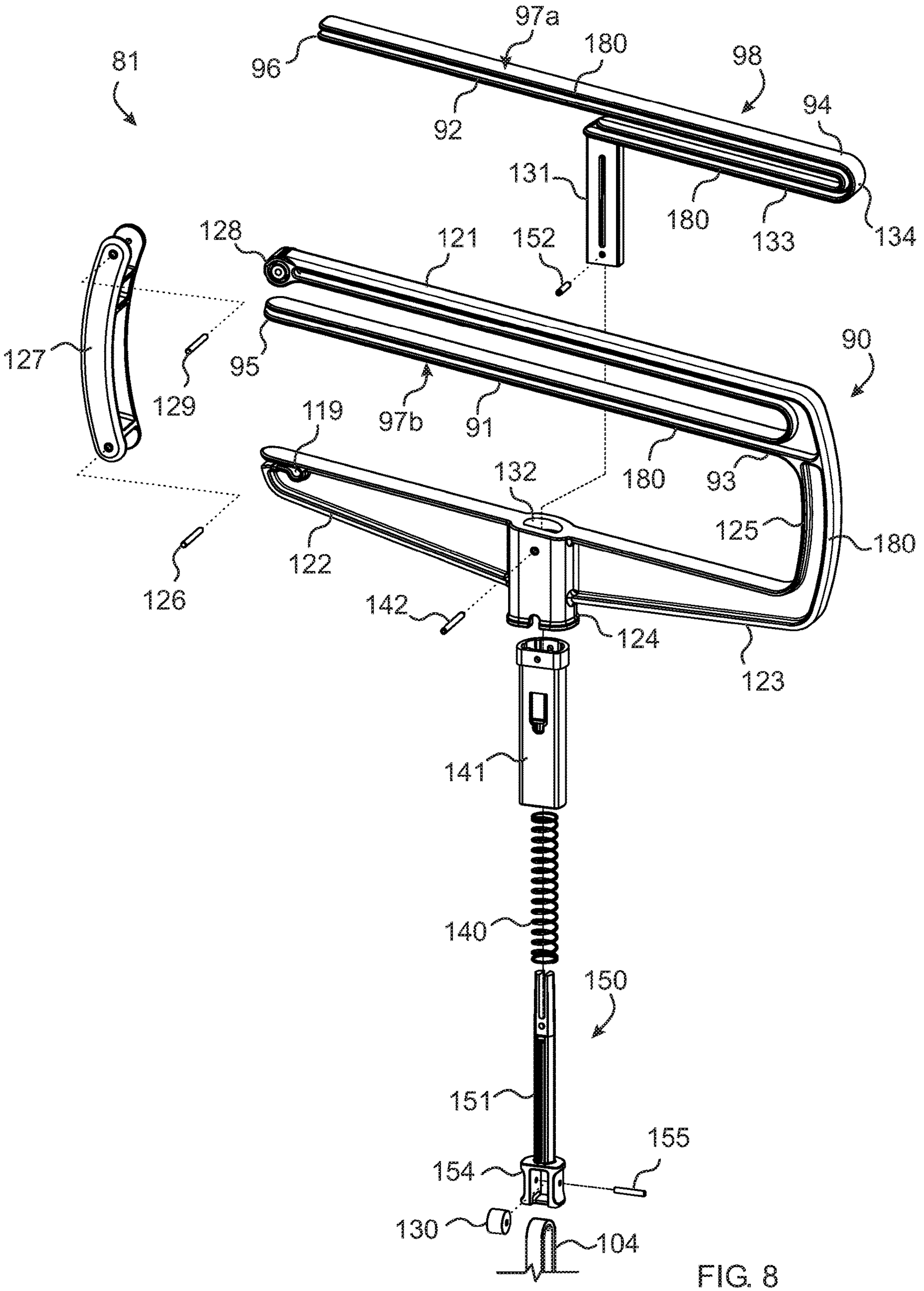
FIG. 8 is a diagrammatic exploded partial perspective view of the articulating dust collector of FIG. 7.
Figure 9:
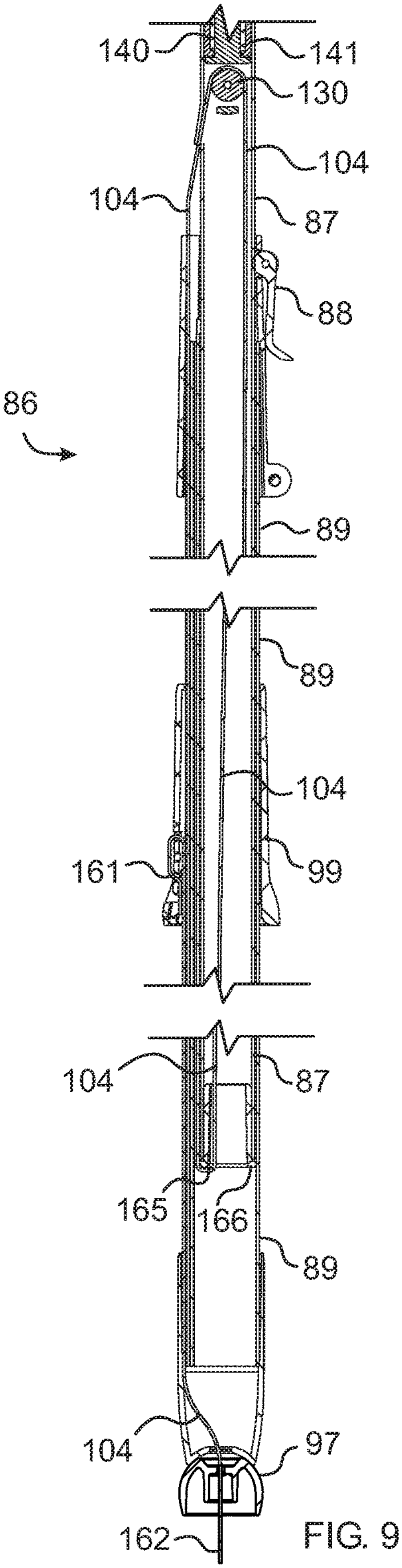
FIG. 9 is a diagrammatic partial cross-sectional view of the articulating dust collector of FIG. 7.

Referring now to FIGS. 7-9, there is shown an alternate embodiment of articulating dust collector 80 which provides for more rapid replacement of the dust collecting sock 100 and ease of manufacture. Similar to the above embodiments, the collector includes an oblong member or extension pole 86 extending along an axis 76 having a distal end 77 upon which is located an actuating head 81 including an openable jaw structure formed by a pair of substantially parallely spaced apart beams 91,92 protected by a guard frame 90 which surrounds the beams in their common plane. The pair of beams therefore can provide a pair of opposing inner surfaces 97_a_,97_b_. A first beam 91 can remain stationary by being fixedly attached to the guard frame 90 while a second beam 92 can be mounted upon an axially and reciprocatingly movable rack 98 whose movement can be triggered by the pull of either a medial handle 99 or knob 97 located at the proximal end 78 of the extension pole. The handle and knob can connect to the opposite ends of a loop of cable 104 connected to the rack through a pulley 130 allowing both the knob and handle to act as a trigger for the jaw manipulation mechanism. Endwise access to the beams can be had by swinging opening 118 a pivotable door 127 on the guard frame. Thus the beams can be parallely separatable within the boundaries of the guard frame.

A collector sock 100 can mount upon the beams. The sock can include a closed end 101 and an open end 121 leading to an inner chamber. The open end can have an opening forming a maw 103 which can accept the fan blade therethrough in an endwise manner in order to clean the blade. The inner surfaces 105*a*,105*b* of the maw are located and oriented to contact the surfaces of the fan blade while the collector is being journaled across the blade. The inner surfaces of the maw can include asperities 111 to facilitate cleaning and can include electrostatic, dust adhering fibers to help capture fine particles of dust. The closed end of the sock can include a reversably openable passageway 106 to help cleaning of the sock in a washing machine. The passageway can be sealed using a buttons, zipper, velcro, or other common fabric fastener. The sock can include a pair of opposed, parallel channels 107,108 formed along the periphery of the maw. Each beam can engage one of the channels to mount the sock upon the head.

Figure 10:
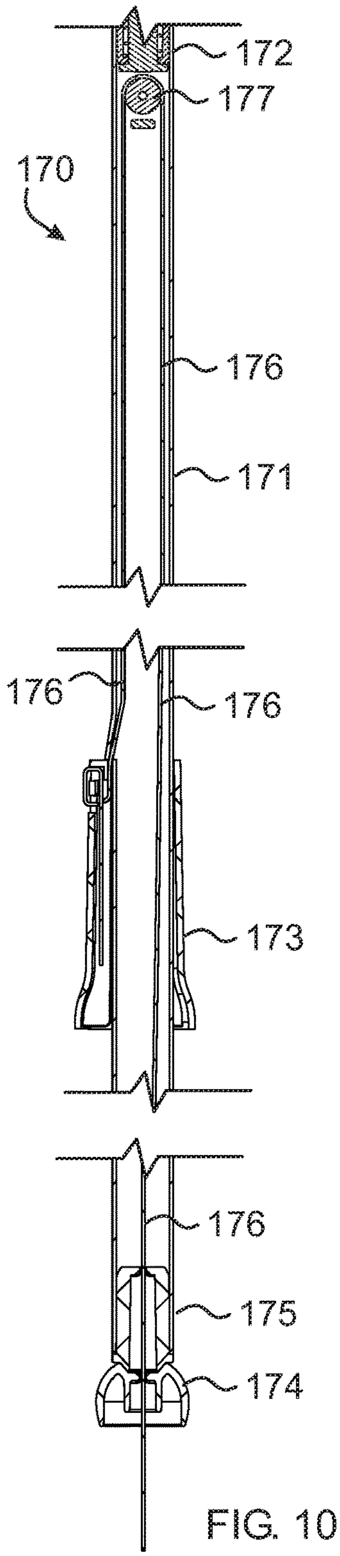
FIG. 10 is a diagrammatic partial cross-sectional view of the articulating dust collector having a non-telescoping type of extension pole.

The extension pole can be of a telescoping or non-telescoping type. FIG. 10 shows a non-telescoping type extension pole. FIGS. 7 and 9 show a telescoping type extension pole 86 including a top piece 87, and a base piece 89. The top piece can have a distal end connected to the head 81 and can be telescopingly mounted to the base piece. A compression collar 88 can lock the axial position of the top piece with respect to the base piece.

Referring primarily to FIG. 8, the head 81 can include a pair of opposing, parallelly spaced apart jaws in the form of canteleveredly supported beams 91,92 each having a connected end 93,94 and an opposite free end 95,96. The first beam 91 can remain stationary by being fixedly attached to the guard frame 90 which can form the outer periphery of the head and protect the beams continuously as the jaw structure moves between its open and closed positions. The beams can be oriented at between about 6 and 10 degrees from the horizontal to accommodate most common fan blade angles while using the extension pole in a substantially vertical orientation.

The guard frame 90 can be substantially U-shaped including an upper lateral support 121 spaced apart from a pair of lower lateral supports 122,123 extending from opposite sides of a central guard frame housing 124. One of the lower lateral supports 123 is connected to the upper lateral support by a substantially vertical support 125 forming the closed end of the U-shape. A door 127 openably closes the open end of the U-shape. The door pivotably connects to a pivot 128 at the free end of the upper lateral support using a pivot axle 129. A catch pin 126 located at the free end of the door engages a frictional snap catch 119 at the free end of the other lower lateral support 122 to lock the guard frame a closed configuration which prevents the inadvertent sliding off of the sock from the beams.

The stationary first beam 91 can connect at its connected end 93 to the vertical support 125 of the guard frame 90. The free end 95 of the stationary first beam can be enclosed by the door 127 in its closed configuration. In this way the door can act as a brace against forward or backward movement of the stationary beam. This bracing function is important to support the cantelevered beams being subjected to front and back forces while the collector is journaled across the blade.

The second moveable beam 92 can be mounted upon an axially movable rack 98 having central post 131 which axially, slidingly engages an axial passage 132 in the central guard frame housing 124. A support arm 133 connects the top of the central post to the connected end 94 of the moveable beam 92 through a curved springing switchback 134 which allows the moveable beam to deflect angularly and accommodate slight angular misalignment of the articulating dust collector to the fan blade.

The jaw manipulation mechanism can further include the moveable beam being biased toward the closed position by a spring 140 carried within a spring sleeve 141 mounted within the central guard frame housing 124 and fixed by a fix pin 142. A pulley carrier 150 can mount to the rack 98 by a pulley prong 151 engaging a hole the central post 131 of the rack. The prong can be fixed to the central post by a fix pin 152. The pulley carrier can include a pulley 130 rotatively mounted to a pulley housing 154 connected to the bottom of the pulley prong. A pulley axle 155 can rotatively support the pulley. The activation cable 104 can loop over the pulley.

As shown on FIG. 9, the activation cable 104 can have a first end 161 connected to the medial handle 99 and a second end 162 connected to the pull knob 97. By looping the cable over the pulley 130 attached to the spring loaded rack 98, both the medial handle and the pull knob can act as triggers to manipulate the jaw. By providing two triggers on the extension pole, the user can avoid fatigue by alternating between the use of the triggers. It shall be noted that the cable 104 can wrap 165 around the bottom 166 of the top piece 87 in order to allow telescoping movement between the top piece and base piece 89 while still providing the dual trigger functionality. The bottom edge of the top piece can be rounded to facilitate the sliding movement of the cable around the bottom.

FIG. 10 shows a non-telescoping type of extension pole 170 having a single elongated pole piece 171 which mounts the head at its distal end 172, a medial handle trigger 173, and a knob trigger 174 at the proximal end 175. A cable 176 can connect at one end to the handle and at the other end to the knob with a middle portion looping over a pulley 177 secured to a rack in a head identical to the head shown in the embodiment of FIGS. 7-9.

The beams can be dimensioned to engage the channels 107,108 of the sock 100 in order to mount the sock to the head 81. The beams are substantially straight so that they support the maw 103 of the sock in a substantially flat manner so that the inner surfaces of the maw uniformly and continuously contact the entire section of the surface of the fan blade extending between the blade edges. In other words, the maw can close upon the section of the fan blade so that the entire surface section of the fan blade between the edges can be contacted continuously and under the force of the enclosing jaws. In other words the inner surfaces can simultaneously contact a top continuous surface extending across said blade between said edges, and a bottom continuous surface extending across the blade section.

It shall be understood that the head structure allows for injection moldable guard frame and rack. Further, the guard frame, rack and beams can readily be formed to have peripheral walls 180 extending frontwardly and backwardly, perpendicularly to the movement axis of the rack in order to rigidize the guard frame, rack and beams while minimizing material and head weight. This strengthens the head and helps avoid user fatigue. The peripheral walls also provide an I-shaped cross-section to the beams to strengthen them while minimizing material.

In this way a pair of cantelevered beams can engage opposing channels on the sock. The top beam can be fixedly supported within the boundaries of a substantially U-shaped guarding frame whose open end is closed by an openable door. The bottom beam can be supported upon a vertically moveable rack that moves within a plane including the other beam that is surrounded by the guard frame.

Although the above utilitarian aspects have been described in connection with a hand-manipulable ceiling fan blade duster, it shall be understood that the duster can easily be adapted to include automated and/or motorized elements.

While the preferred embodiments of the invention have been described, modifications can be made and other embodiments may be devised without departing from the spirit of the invention and the scope of the appended claims.

What is claimed is:

1. A dusting apparatus comprises:

a jaw structure comprising:

a pair of opposing inner surfaces;

a first beam supporting a first one of said pair of opposing inner surfaces;

a second beam supporting a second one of said pair of opposing inner surfaces;

and, wherein said first beam is canteleveredly supported upon a stationary frame; and wherein said second beam is canteleveredly supported upon a movable rack; and, wherein said movable rack comprises a springing switchback.

2. The apparatus of claim 1, wherein each of said beams has an I-shaped cross-section.

3. The apparatus of claim 2, which further comprises:

a stationary frame supporting at least one of said beams; and, wherein said stationary frame comprises a substantially U-shaped guard planarly surrounding said first and second beams.

4. The apparatus of claim 3, wherein said stationary frame further comprises a door openably closing an open end of said guard.

5. The apparatus of claim 1, wherein said first and second beams are substantially parallely spaced apart and are oriented to between about 6 and 10 degrees from the horizontal.

6. The apparatus of claim 1, which further comprises a brace bearing against a first free end of said first beam, and bearing against a second free end of said second beam.

7. The apparatus of claim 1, which further comprises a pliable sock secured upon said beams, wherein said sock comprises:

an open end;

a pair of opposed channels located on a periphery of said open end;

wherein each of said channels is formed to be engaged by one or the other of said beams.

8. The apparatus of claim 7, wherein said pliable sock further comprises:

a closed end opposite said open end, wherein said closed end is reversably openable;

inwardly facing sock surfaces comprising a plurality of asperities extending therefrom; and, a patch of dust attracting material located on at least one of said inwardly facing sock surfaces.

9. The apparatus of claim 1, wherein a first one of said first and second beams is reciprocatingly moveable with respect to a second one of said first and second beams between an open position and a closed position; and, wherein said beams are spaced apart a first distance in said open position, and said beams are spaced apart a second distance in said closed position.

10. The apparatus of claim 1, wherein said apparatus further comprises:

a jaw manipulation mechanism for moving said jaw structure between an open position and a closed position; and, wherein said jaw manipulation mechanism is biased toward said closed position.

11. The apparatus of claim 1, wherein said apparatus further comprises:

an elongated member comprising:

a top piece;

a base piece;

said top piece connected to said jaw structure;

said top piece being telescopingly connected to said base piece;

at least one trigger mounted to said elongated member; and, a jaw manipulation mechanism responsive to said at least one trigger for moving said jaw structure between said open position and said closed position.

12. An apparatus for dusting a ceiling fan blade having a pair of substantially parallel lateral edges, said apparatus comprises:

a pliable sock comprising an open end;

a jaw structure comprising a pair of opposing inner surfaces;

said opposing inner surfaces being oriented to simultaneously contact a top continuous surface extending across said blade between said edges, and a bottom continuous surface extending across said blade between said edges;

wherein said open end of said sock is releasably mounted to said jaw structure, whereby said open end forms a maw;

wherein said maw is shaped an dimensioned to slip over said fan blade in an end-wise manner;

wherein said jaw structure further comprises:

a first beam supporting a first one of said pair of opposing inner surfaces;

a second beam supporting a second one of said pair of opposing inner surfaces; and, wherein said first and second beams are canteleveredly supported.

13. The apparatus of claim 12, which further comprises:

a stationary frame supporting at least one of said beams; and, wherein said stationary frame comprises a substantially U-shaped guard planarly surrounding said first and second beams.

14. The apparatus of claim 13, wherein said stationary frame further comprises a door openably closing an open end of said substantially U-shaped guard.

15. The apparatus of claim 13, wherein said apparatus further comprises:

said first beam being canteleveredly supported upon said stationary frame; and, said second beam being canteleveredly supported upon a movable rack.

16. The apparatus of claim 15, wherein said movable rack comprises a springing switchback.

17. The apparatus of claim 12, which further comprises:

said jaw structure being movable between an open position and a closed position;

wherein at least one of said beams is axially and reciprocatingly moveable between an upper axial location and a lower axial location corresponding to said jaw structure being in said closed position and said open position respectively.

18. The apparatus of claim 12, wherein said apparatus further comprises:

an elongated member comprising:
a top piece;
a base piece;
said top piece connected to said jaw structure;
said top piece being telescopingly connected to said base piece;
at least one trigger mounted to said elongated member; and,
a jaw manipulation mechanism responsive to said at least one trigger for moving said jaw structure between said open position and said closed position.

* * * * *